United States Patent [19]

Hess et al.

[11] Patent Number: 4,553,309

[45] Date of Patent: Nov. 19, 1985

[54] ROBOTIC ASSEMBLY OF VEHICLE HEADLINERS

[75] Inventors: Edward C. Hess, Farmington Hills; Edward Trevino, Harrison Twp., Macomb County, both of Mich.

[73] Assignee: General Motors Corporation, Detroit, Mich.

[21] Appl. No.: 654,567

[22] Filed: Sep. 26, 1984

[51] Int. Cl.⁴ .............................................. B67B 7/24
[52] U.S. Cl. ...................................... 29/450; 29/791; 29/793; 29/759
[58] Field of Search ................. 29/450, 464, 793, 794, 29/759, 795, 791; 901/7, 30, 45; 414/749, 751

[56] References Cited

FOREIGN PATENT DOCUMENTS 0110045 6/1984 European Pat. Off. ............. 901/30

Primary Examiner—Howard N. Goldberg
Assistant Examiner—Leonard S. Selman
Attorney, Agent, or Firm—Ronald L. Phillips

[57] ABSTRACT

A method is disclosed of using a robot with a single fixture to install a headliner in a vehicle body on an assembly line wherein both the configuration of the vehicle body and the material and/or color as well as the configuration of the headliner vary and are combined at an assembly station.

2 Claims, 4 Drawing Figures

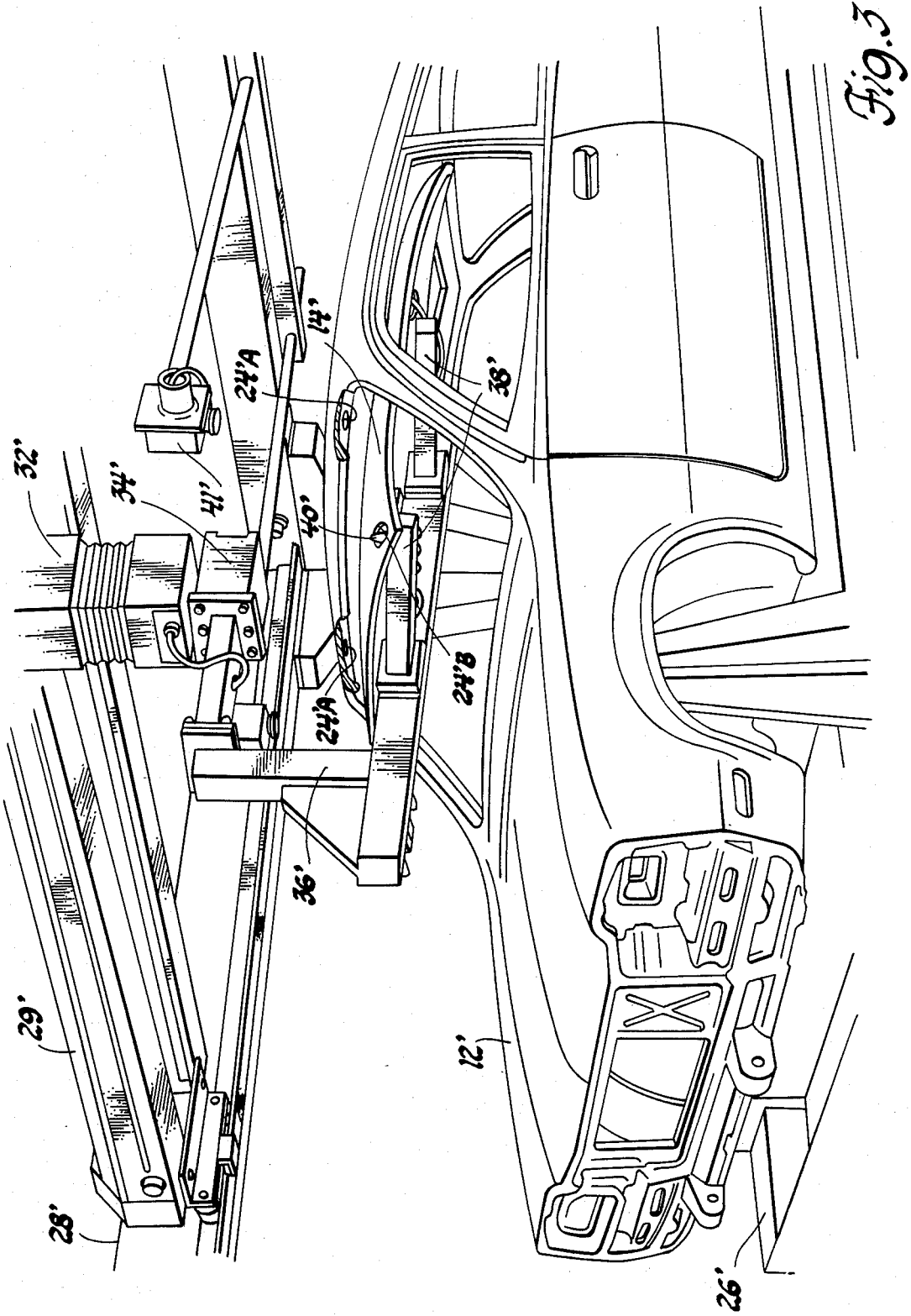

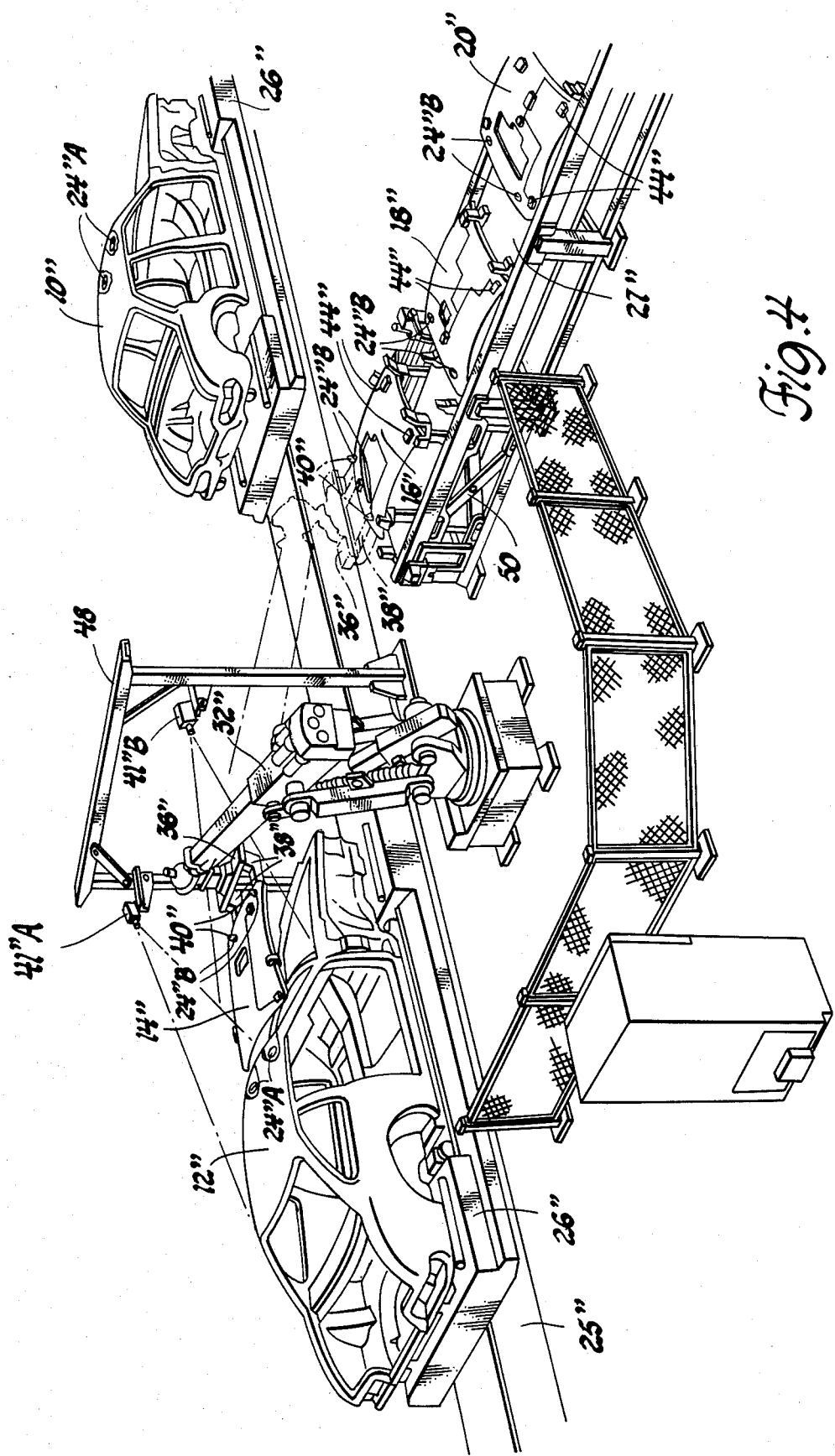

ROBOTIC ASSEMBLY OF VEHICLE HEADLINERS

TECHNICAL FIELD

This invention relates to robotic assembly of vehicle headliners and, more particularly, to a method of using a robot to install a headliner in a vehicle body wherein both the configuration of the vehicle body and the material and/or color as well as the configuration of the headliner vary and are selectively combined at assembly.

BACKGROUND OF THE INVENTION

In the installation of a headliner in a vehicle body on an assembly line, it is desirable to allow both the configuration of the vehicle body and the material and/or color as well as the configuration of the headliner vary and be selectively combined at a single assembly station. Robotic assembly appears to be the best answer, but with the wide selection of vehicle bodies and headliners with their normally varying installation requirements, there would normally be required a number of robots dedicated to the various installation matchups or possibly one robot with multiple fixturing suited to the varying tasks.

SUMMARY OF THE INVENTION

The inventors in arriving at the present invention observed that there are normally provided sunshade accommodating holes in both the vehicle body ceiling and its headliner but that their locations are typically different in the different vehicle bodies for various but not unalterable reasons such as aesthetics and space allocation. The inventors seized on this finding and used it to advantage in making the present invention which provides for the use of a single robot with singular fixturing to reduce both capital expenditure and assembly time and improve quality. This is simply accomplished by forming all the various vehicle bodies and headliners to be assembled with a pair of common sunshade accommodating holes and then providing an arm of a robot with a fixture having a pair of locators corresponding to these common sunshade accommodating holes. The different vehicle bodies may then be sequentially conveyed to and from the robot while the headliners are coordinated and sequentially conveyed to the robot so as to correspond in a prescribed matchup with the vehicle bodies approaching same. The robot arm is programmed to pick up, support and hold the leading headliner by the fixture locators engaging in the sunshade accommodating holes in the headliner. Thereafter, the robot arm with the headliner supported thereon is programmed to enter the leading vehicle body through its windshield opening and extend beneath its ceiling. The robot arm with the headliner supported thereon then locates and also engages the fixture locators in the sunshade accommodating holes in the vehicle body and thereafter lifts the supported and located headliner thereon into position against the vehicle body ceiling for affixing thereto.

These and other objects, advantages and features of the present invention will become more apparent from the following description and drawings in which:

DESCRIPTION OF THE DRAWINGS

FIG. 3 is an enlarged isometric view of the apparatus in FIG. 2 but from a frontal angle viewing of the vehicle body and with the robot shown entering the vehicle body windshield opening; and FIG. 4 is an isometric view of another form of the apparatus for carrying out the method of the present invention using a floor mounted robot.

Referring to FIG. 1, there is shown a robotic headliner installation station on a vehicle assembly line where both the configuration of the vehicle body and the material and/or color as well as the configuration of the headliner vary and are combined according to a prescribed matchup at this station. For example, in the drawing there are shown two different vehicle bodies 10 and 12, and to the ceiling of these bodies there is to be affixed any one of a number of headliners 14, 16, 18, 20 and 22 which may vary in material and/or color as well as configuration. Normally, the different vehicle bodies and their associated headliners would all have sunshade accommodating holes for the installation of sunshades (also called sun screens or visors), but their locations would typically vary between the different body designs.

Figure 1:
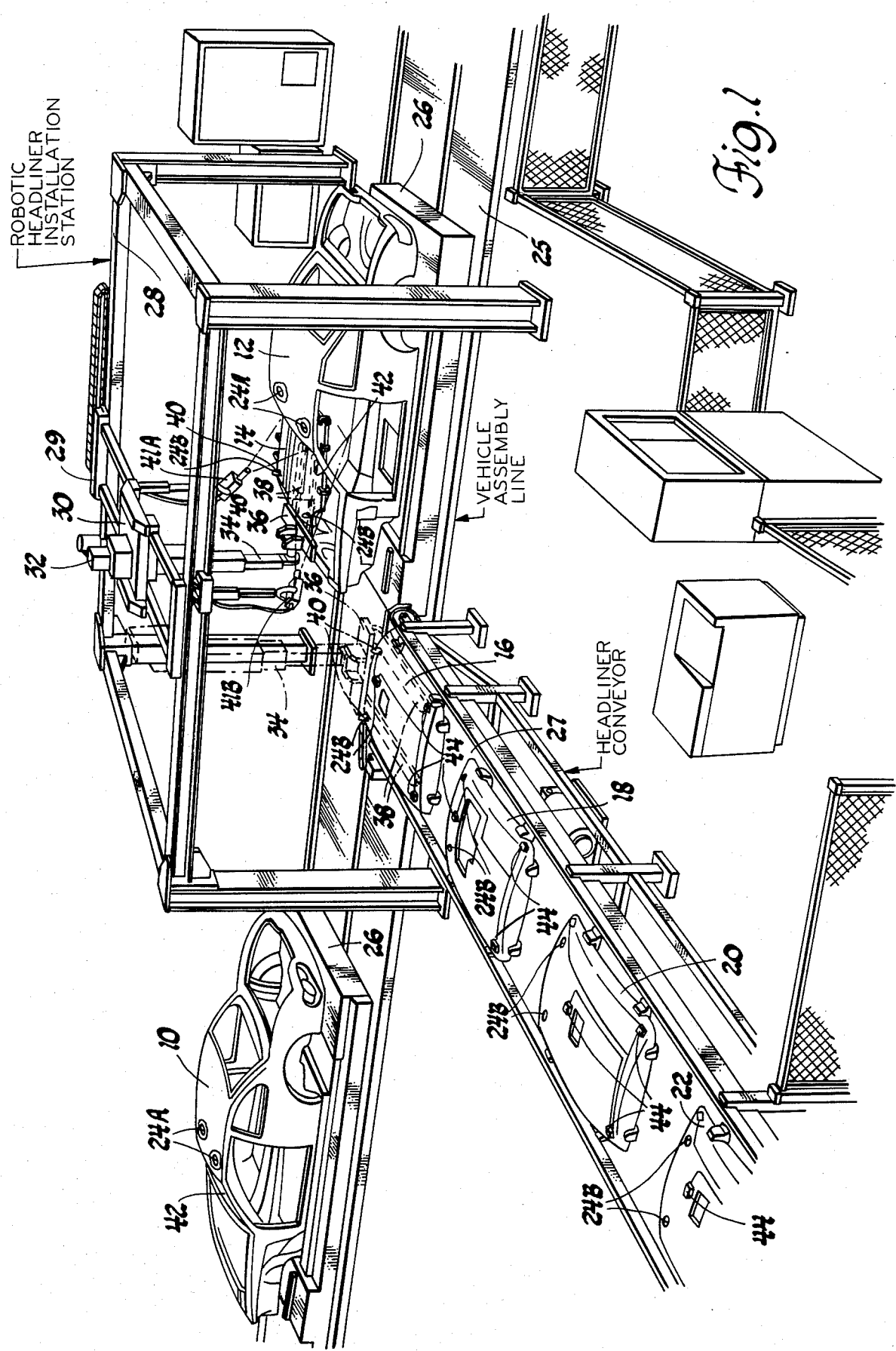
FIG. 1 is an isometric view of one embodiment of apparatus for carrying out the method of the present invention on a vehicle assembly line using an overhead mounted robot.

According to the present invention, all the various vehicle bodies and headliners to be assembled on the one assembly line are provided with a pair of common sunshade accommodating holes designated as 24A in the ceiling of the different vehicle bodies and designated as 24B in the different headliners. Then on the assembly line, the different vehicle bodies such as 10 and 12 are sequentially conveyed to and from the station by a floor conveyor 25 having platforms 26 supporting the respective vehicle bodies. Then at right angles to the vehicle assembly line at the station there is provided a headliner conveyor. This conveyor has an endless conveyor belt 27 on which the different headliners 14, 16, 18, 20, and 22 are coordinated and then conveyed thereby to the installation station so as to correspond in a prescribed matchup with the vehicle bodies approaching the station.

At the headliner installation station, there is provided a frame 28 extending over the vehicle assembly line. A first trolley 29 is mounted directly on the frame for movement parallel to and overhead the assembly line and a second trolley 30 is mounted on the first trolley for movement at right angles to the assembly line. A robot 32 is mounted on the second trolley 30 overhead of the vehicles being conveyed and has a downwardly extending arm 34 which is both vertically movable and rotatable about the vertical, the robot being of conventional design except for the fixture attached thereto and now to be described.

Having in mind the common sunshade accommodating holes 24A, 24B in the ceiling of the various vehicle bodies and the various headliners respectively, a single fixture 36 is attached to the robot arm 34 for holding all the various headliners. To this end, the fixture 36 has a pair of parallel feet 38 which extend horizontally and are adapted to slide longitudinally along and underneath the headliners. More importantly, the fixture 36 has adjacent the robot arm 34 a pair of upstanding or vertical pin locators 40 located to correspond with the common sunshade accommodating holes 24A, 24B in the various vehicle bodies and headliners. The robot 32 operating with overhead cameras 41A and 41B mounted on the trolley 30 and frame 28 respectively is programmed to have its arm 34 manipulate the fixture 36 so as to pick up, support and hold the leading headliner (that at the end of the headliner conveyor) by the fixture locators 40 engaging in the sunshade accommodating holes 24B in this leading headliner as shown in phantom line in FIG. 1. The robot is further programmed with the headliner supported thereon to enter the leading vehicle body through its windshield opening 42 and extend beneath its ceiling as shown in solid line in FIG. 1. The robot is further programmed with the headliner supported thereon to then locate and also engage the fixture locators 40 in the sunshade accommodating holes 24A in the ceiling of the vehicle body. The robot is further programmed to then have its arm move or raise the supported and located headliner thereon into position against the vehicle body ceiling for affixing thereto. Such affixing may, for example, be by the provision of Velcro attachment strips 44 previously strategically installed on the various headliners and in corresponding places on the vehicle body ceilings with which such headliners are to matchup. With the use of such Velcro attachment strips, the robot is programmed upon proper location of the headliner to then simply effect the required upward pressurized movement of same to effect fastening of the corresponding strips. Furthermore, it will be understood that additional cameras and/or sound sensors are employed to scan and identify the precise vehicle body and headliner inventory locations on and along the line which are computer recorded for integration into the robot pick up and installation operations. Thus, the system is entirely automatic and is cost effective from a capital outlay, direct labor and quality analysis standpoint in that only a single robot with a single common fixture is required to implement the headliner assembly method.

Figure 2:
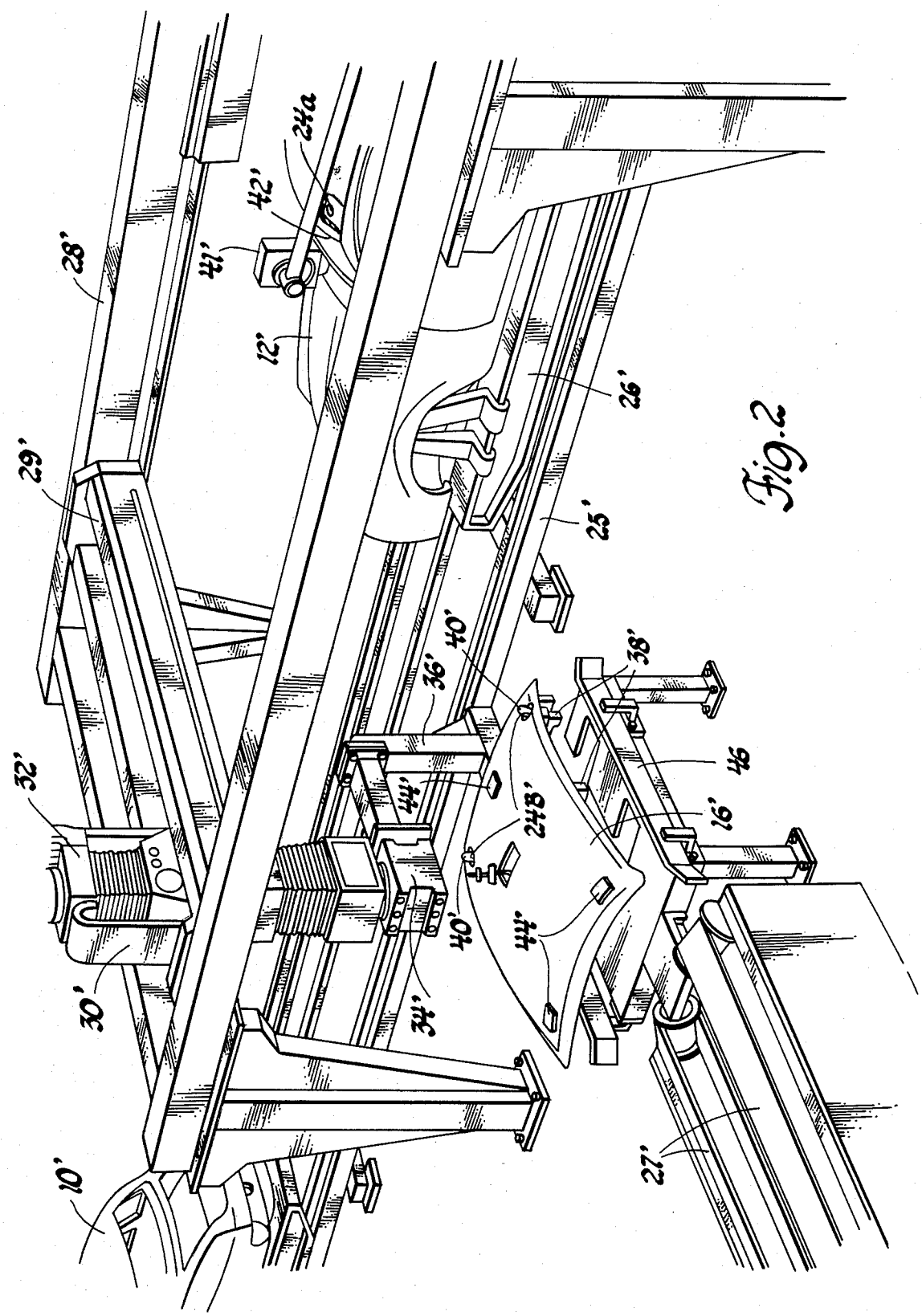
FIG. 2 is an isometric view showing another form of overhead robot apparatus for carrying out the method of the present invention.

In FIGS. 2 and 3 wherein parts similar to those shown in FIG. 1 are identified by the same numbers only primed and new parts with new numbers, there is disclosed another embodiment of the overhead robotic system for installing the headliners. In this embodiment, the frame 28', two trolleys 29', 30' and robot 32' are retained but in another form as shown. In particular, the fixture 36' attached to the robot arm 34' is provided with a hook shape and transverse feet 38' so that with the pin locators 40' located in the sunshade accommodating holes in the headliner, the headliner is supported directly beneath the robot and the latter can better apply upward pressure in the fixing of the headliner to the vehicle ceiling. In addition, the headliner conveyor is now formed with two separate and parallel endless belts 27', which direct the headliners such as the headliner 16' onto an elevated stationary holding platform 46 for pickup by the fixture 36' on the robot. Furthermore, in this embodiment of the apparatus there is employed a single wide angle camera 41' for the operation of the robot that is mounted overhead on the robot supporting frame 28'.

In FIG. 4, there is shown still another embodiment of the apparatus for performing the method of the present invention wherein parts similar to those previously described are identified by the same numbers only double primed and new parts are identified by new numbers. In this case, the robot 32" remains conventional but is now of the floor mounted type while the fixture 36" remains like that in the FIG. 1 apparatus. With there no longer a need for a robot supporting frame, the cameras 41"A and 41"B are now mounted on a two-legged frame 48 provided solely for supporting same. Furthermore, there remains an endless conveyor belt 27" like in the FIG. 1 apparatus, but unlike that in either the FIG. 1 or FIGS. 2 and 3 apparatus, there is now provided at the end of the headliner conveyor an elevator platform 50 for elevating the leading headliner at the end of the line to a position for easy access by the robot fixture 36". Otherwise, the apparatus in FIG. 4 remains the same and is operable to perform the method of headliner installation previously described with the fixture pin locators 40" operating in conjunction with both the common sunshade accommodating holes 24"B in the various headliners and 24"A in the ceiling of the various vehicle bodies.

The above-described embodiments are illustrative of the invention which may be modified within the scope of the appended claims.

The embodiments of the invention in which an exclusive property or privilege is claimed are defined as possible:

1. A method of using a robot to install a headliner in a vehicle body on an assembly line wherein both the configuration of the vehicle body and the material and/or color as well as the configuration of the headliner vary and are combined at an assembly station comprising the steps of:

forming all the various vehicle bodies and headliners with common sunshade accommodating holes, providing an arm of the robot with a fixture having locators corresponding to the sunshade accommodating holes in the vehicle bodies and headliners, sequentially conveying the vehicle bodies relative to the robot, coordinating and sequentially conveying the headliners relative to the robot so as to correspond in a prescribed matchup with the vehicles bodies approaching the robot, having the robot arm pick up, support and hold a preselected headliner by the fixture locators engaging in the sunshade accommodating holes in the headliner, having the robot arm with the headliner supported thereon enter a preselected headlinerless vehicle body through its windshield opening and extend beneath its ceiling, having the robot arm with the headliner supported thereon locate and also engage the fixture locators in the sunshade accommodating holes in the vehicle body, and having the robot arm move the supported and located headliner thereon into position against the vehicle body ceiling for affixing thereto.

2. A method of using a robot to install a headliner in a vehicle body on an assembly line wherein both the configuration of the vehicle body and the material and/or color as well as the configuration of the headliner vary and are selectively combined at an assembly station comprising the steps of:

forming all the various vehicle bodies and headliners with a pair of common sunshade accommodating holes, providing an arm of the robot with a fixture having a pair of locators corresponding to the sunshade accommodating holes in the vehicle bodies and headliners, sequentially conveying the vehicle bodies to and from the robot, coordinating and sequentially conveying the headliners to the robot so as to correspond in a prescribed matchup with the vehicles bodies approaching the robot, having the robot arm pick up, support and hold the leading headliner by the fixture locators engaging in the sunshade accommodating holes in the headliner, having the robot arm with the headliner supported thereon enter the leading headlinerless vehicle body through its windshield opening and extend beneath its ceiling, having the robot arm with the headliner supported thereon locate and also engage the fixture locators in the sunshade accommodating holes in the vehicle body, and having the robot arm move the supported and located headliner thereon into position against the vehicle body ceiling and effect pressurized affixing thereto.

* * * * *